(12) United States Patent
Takiguchi et al.

(10) Patent No.: US 6,662,013 B2
(45) Date of Patent: Dec. 9, 2003

(54) LOCATION MESSAGING SYSTEM USING GPS

(75) Inventors: Kiyoaki Takiguchi, Kanagawa (JP); Takaaki Nakamura, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/179,485

(22) Filed: Oct. 27, 1998

(65) Prior Publication Data
US 2001/0014597 A1 Aug. 16, 2001

(30) Foreign Application Priority Data
Oct. 28, 1997 (JP) ............................................. 9-295698

(51) Int. Cl.[7] ................................................. H04Q 7/20
(52) U.S. Cl. ................................ 455/456.2; 455/343.3; 342/357.06
(58) Field of Search ......................... 342/357.1, 357.12, 342/457, 357.06; 455/343, 38.3, 456, 457, 456.1, 456.2, 456.3, 456.5, 456.6, 343.1, 343.2

(56) References Cited

U.S. PATENT DOCUMENTS

| | | | | |
|---|---|---|---|---|
| 5,365,450 A | * | 11/1994 | Schuchman et al. | 364/449 |
| 5,603,077 A | * | 2/1997 | Muckle et al. | 455/3.2 |
| 5,663,734 A | * | 9/1997 | Krasner | 342/357 |
| 5,712,899 A | * | 1/1998 | Pace, II | 379/58 |
| 5,752,218 A | * | 5/1998 | Harrison et al. | 701/207 |
| 5,786,789 A | * | 7/1998 | Janky | 342/357 |
| 5,874,914 A | * | 2/1999 | Krasner | 342/357 |
| 5,883,594 A | * | 3/1999 | Lau | 342/357.1 |
| 5,918,180 A | * | 6/1999 | Dimino | 455/456 |
| 5,963,130 A | * | 10/1999 | Schlager et al. | 340/540 |
| 5,999,125 A | * | 12/1999 | Kurby | 342/357.1 |
| 6,002,363 A | * | 12/1999 | Krasner | 342/357.1 |
| 6,014,555 A | * | 1/2000 | Tendler | 455/404 |
| 6,131,067 A | * | 10/2000 | Girerd et al. | 701/213 |
| 6,133,871 A | * | 10/2000 | Krasner | 342/357.06 |
| 6,144,336 A | * | 11/2000 | Preston et al. | 342/357.09 |
| 6,150,980 A | * | 11/2000 | Krasner | 342/357.06 |
| 6,169,515 B1 | * | 1/2001 | Mannings et al. | 342/357.1 |
| 6,438,381 B1 | * | 8/2002 | Alberth et al. | 455/456.5 |
| 6,519,466 B2 | * | 2/2003 | Pande et al. | 455/456.1 |
| 6,590,525 B2 | * | 7/2003 | Yule et al. | 342/357.06 |

* cited by examiner

Primary Examiner—Curtis Kuntz
Assistant Examiner—Barry W Taylor
(74) Attorney, Agent, or Firm—Frommer Lawrence & Haug LLP; William S. Frommer; Bruno Polito

(57) ABSTRACT

A GPS receiver communicates with a management center through a portable telephone terminal. The management center is connected to a telephone unit and a facsimile unit in a house through a telephone line. When the user presses a predetermined button with the telephone unit, a request for location information of the receiver is transmitted to the management center. The management center transmits the location information request as a DTMF signal to the receiver. The receiver measures the location thereof. The measured result and time information of a navigation message thereof are transmitted as a DTMF signal. When the management center determines that the message is old corresponding to the time information, the management center compensates the measured result. The management center transmits the location information to the telephone unit. The management center transmits image data with map information to the facsimile unit.

42 Claims, 12 Drawing Sheets

Fig. 3A

| COMMAND | MODE |
|---|---|
| #00x | GPS POWER SET (x = 0: ON, x = 1: OFF) |
| #01 | LOCATION INFORMATION TRANSMISSION REQUEST (AUTOMATIC RETRANSMISSION UNLESS RECEPTION OF "#03" IN 2 SECONDS AFTER TRANSMISSION) |
| #02 | CONTINUOUS LOCATION INFORMATION TRANSMISSION REQUEST (THIS COMMAND IS TRANSMITTED IN SECOND OR LATER TRANSMISSION. LOCATION INFORMATION WITHOUT ID IS REQUESTED.) |
| #03 | TRAVELING INFORMATION TRANSMISSION REQUEST (AS REPORT) |
| #04xy | POWER SAVE (INTERMITTENT LOCATION MEASUREMENT) MODE SET (AT INTERVALS OF xy MINUTES) |
| #05 DDHHMMx | POWER ON/OFF INTERVAL SET WITH TIMER (DD DAY, HH HOUR, MM MINUTE, x = 0: ON, x = 1: OFF) |
| #06? | DESIGNATED PERMITTED/PROHIBITED AREA REMOTE SET (UP TO 10 AREAS) |
| #07xy | DESIGNATED PERMITTED AREA SET (RADIUS X.Y (km) FROM CURRENT LOCATION) |
| #08xy | INTERMITTENT MEASUREMENT SET (AT INTERVALS OF xy MINUTES) |
| #09 | LOCATION INFORMATION CONTINUOUS TRANSMISSION REQUEST (AT INTERVALS OF 5 MINUTES) |

Fig. 3B

| COMMAND | MODE |
|---|---|
| *00 | GPS ABNORMALITY MESSAGE |
| *01 | |
| *02 | |
| *03 | |
| *04 | |
| *05 | |
| *06 | |
| *07 | AREA ARRIVAL MESSAGE (USER'S MANUAL TRANSMISSION) |
| *08x | PROHIBITED AREA MESSAGE<br>(x: PROHIBITED AREA NO.)(AUTOMATIC TRANSMISSION) |
| *09 | PERMITTED AREA EXIT MESSAGE (AUTOMATIC ORIGINATION) |
| *10 YYMMDD | NAVIGATION MESSAGE (ALMANAC DATA) REQUEST<br>(TRANSMITS DATA OBTAINED ON MM MONTH DD DAY YY YEAR<br>AND RECEIVES DIFFERENCE.) |
| *11 DDHHMM | NAVIGATION MESSAGE (EPHEMERIS DATA) REQUEST<br>(TRANSMITS DATA OBTAINED ON MM MONTH DD DAY YY YEAR<br>AND RECEIVES DIFFERENCE.) |

LOCATION MESSAGING SYSTEM USING GPS

BACKGROUND OF THE INVENTION

1. Field of the Invention

The present invention relates to a GPS (Global Positioning System) receiver for automatically messaging a measured location to the user using the GPS, a GPS management station thereof, and a location messaging system thereof.

2. Description of the Related Art

A location messaging system using a GPS receiver has become common. The location messaging system messages a measured location to the user. The GPS receiver receives spectrum spread signals of for example ephemeris data and almanac data from each of several to ten and several satellites and obtains location information (latitude and longitude). The almanac data is used to decide a satellite that the receiver can acquire. On the other hand, the ephemeris data is accurate location information of the acquired satellite and is used to obtain the distance between the receiver and the acquired satellite.

The GPS receiver receives data from for example three satellites and calculates its pseudo position corresponding to turnaround time of each data. In addition, the GPS receiver receivers data from a fourth satellite, corrects an error of the pseudo distance, and obtains its current location.

In recent years, the GPS have been proposed for messaging the location of a prowling aged person to a guardian and for tracking a stolen car. To use the GPS for such purposes, the power of the GPS receiver should be always turned on. Alternatively, as the user requires, the GPS receiver should be remotely turned on so as to obtain the location information thereof. Since the GPS receiver performs a large number of calculations for obtaining location information corresponding to received data, the power consumption of the GPS receiver is large. Thus, when the GPS receiver is used in a portable unit, it is not practical to always turn on the power of the GPS receiver. Consequently, the GPS receiver should be remotely controlled.

However, since a conventional GPS receiver does not have an automatic call receiving means or a received call recognizing means, it is difficult to remotely control the GPS receiver. A GPS receiver that can automatically originate a call to a particular telephone number has been disclosed in Japanese Patent Laid-Open Publication No. 7-240964 as a portable security apparatus. However, this GPS receiver cannot automatically receive a call. Thus, since the GPS receiver cannot be polled, it cannot be managed by a center station. In addition, the location of the GPS receiver cannot be passively and remotely obtained.

In an information transmitting means of a GPS receiver as the above-described related art reference of Japanese Patent Laid-Open Publication No. 7-240964, titled "Portable Security Apparatus", and another related art reference of Japanese Patent Laid-Open Publication No. 8-280052, titled "Message Data Transmitting/Receiving System, Message Data Transmitting/Receiving Apparatus, and Message Data Receiving Apparatus", a DTMF (Dial Tone Multi-Frequency) signal is transmitted as a push-phone tone signal. However, although these apparatuses have a data transmitting/receiving means, they do not have a data recognizing means. Thus, in these related art references, it is difficult to remotely control the GPS receiver.

In the related art references, since it is difficult to remotely control the GPS receiver, there are various problems. For example, in the conventional GPS receiver, a dialer can be automatically operated. However, to activate the dialer, a button or an emergency switch of the GPS receiver should be manually operated. Thus, the conventional GPS receiver cannot be non-attendantly or automatically operated.

In addition, since the conventional GPS receiver does not have the automatic call receiving means and the data recognizing means, the base station cannot set the operation of the GPS receiver and remotely control it. Moreover, the base station cannot set a hazard area to the GPS receiver and remotely turn on/off the power thereof. In particular, since the power consumption of the GPS receiver is large, the power of the GPS receiver should be remotely controlled. However, the conventional technologies do not satisfy such requirements.

As an information transmitting means of the GPS receiver, a DTMF signal is preferably used from viewpoints of its simplicity and communication path. In other words, a DTMF signal generating means disposed in the GPS receiver can be used. Thus, an existing analog line can be selected as a communication path. Moreover, in a digital portable telephone network, the DTMF signal can be used as digital data code thereof in the network. Thus, the reliability of the analog line is further improved. On the other hand, many types of information can be obtained from the GPS (for example, the latitude and altitude of the GPS receiver, the speed and traveling direction of the GPS receiver, the current time, and so forth). Thus, it is not proper to transmit all types of information as a DTMF signal obtained form the GPS receiver from viewpoints of transmission time and reliability. In addition, since the conventional technologies do not allow the GPS receiver to be remotely controlled, the contents of the transmission data are fixed.

Thus, in the conventional GPS receiver that receives data as a DTMF signal, only location information of latitude and longitude is obtained as GPS information to be transmitted. Conventionally, information such as the speed and traveling direction of the GPS receiver that is obtained as GPS information is discarded. In the conventional method, to obtain such information, the GPS receiver should frequently transmit location information to the base station. The base station should calculate the speed and traveling direction of the GPS receiver with the location information received therefrom. Thus, in the system, the communication time and communication interval become large. In addition, the base station should perform a history management for each GPS receiver.

In addition, the conventional GPS receiver does not have a receiving function for other than GPS data. Thus, the base station cannot transmit for example basis information of almanac data to the GPS receiver. The GPS receiver acquires a satellite and measures the latitude and longitude of the location of the GPS receiver corresponding to the almanac data. Thus, when the power of the GPS receiver is turned off for a long time or almanac data cannot be received from a satellite for a long time, the almanac data should be received from the satellites and downloaded to the GPS receiver. However, it takes around 20 minutes to download the almanac data. Thus, the GPS receiver cannot be quickly re-started.

The GPS receiver can receive data from satellites in an area free of obstacles (for example on a sea). Thus, the GPS receiver can always measure the latitude and longitude thereof. In contrast, in a town or a valley where there are full of obstacles, since the GPS receiver cannot properly receive data from satellites, it cannot accurately measure its location. In this case, the GPS receiver should use the latest location information measured one second before.

However, in the conventional technologies, information as a DTMF signal obtained from the GPS receiver is limited to location information of the latitude and longitude thereof. Thus, measured time data (time stamp) cannot be obtained. Consequently, the GPS receiver cannot determine whether location information is new information or old information (for example, several hours before). In other words, the basic reliability of the location messaging means of a mobile substance is low.

OBJECTS AND SUMMARY OF THE INVENTION

An object of the present invention is to provide a GPS receiver, a GPS management station, and a location messaging system that allow the location of the GPS receiver to be remotely, automatically, and accurately measured.

A first aspect of the present invention is a GPS receiver for receiving navigation messages from a plurality of satellites and measuring the location of the GPS receiver corresponding to the received navigation messages, comprising a signal processing means for receiving signals from the satellites, extracting navigation messages from the signals, and measuring the location of the GPS receiver corresponding to the extracted navigation messages, and a transmitting means for adding time information at which each of the navigation messages was extracted to the relevant navigation message and transmitting the resultant data to the outside of the GPS receiver.

A second aspect of the present invention is a GPS management station for managing a GPS receiver that receives navigation messages from a plurality of satellites and measures the location of the GPS receiver corresponding to the navigation messages and for downloading the navigation messages received from the satellites, comprising a means for transmitting a control signal to the GPS receiver so as to control the GPS receiver, and a means for receiving navigation messages with time information at which the navigation messages were extracted from the GPS receiver.

A third aspect of the present invention is a location messaging system, comprising a GPS receiver for receiving navigation messages from a plurality of satellites and measuring the location of the GPS receiver corresponding to the received navigation messages, the GPS receiver having a signal processing means for receiving signals from the satellites, extracting navigation messages from the signals, and measuring the location of the GPS receiver corresponding to the extracted navigation messages, and a transmitting means for adding time information at which each of the navigation messages was extracted to the relevant navigation message and transmitting the resultant data to the outside of the GPS receiver, and a GPS management station having a means for transmitting a control signal to the GPS receiver so as to control the GPS receiver, and a means for receiving navigation messages with time information at which the navigation messages were extracted from the GPS receiver.

A fourth aspect of the present invention is a location messaging system, comprising a GPS receiver for receiving navigation messages from a plurality of satellites and measuring the location of the GPS receiver corresponding to the received navigation messages, the GPS receiver having a signal processing means for receiving signals from the satellites, extracting navigation messages from the signals, and measuring the location of the GPS receiver correspond-ing to the extracted navigation messages, and a transmitting means for adding time information at which each of the navigation messages was extracted to the relevant navigation message and transmitting the resultant data to the outside of the GPS receiver, a GPS management station having a means for transmitting a control signal to the GPS receiver so as to control the GPS receiver, and a means for receiving navigation messages with time information at which the navigation messages were extracted from the GPS receiver, and an information unit for communicating with the GPS management station.

A fifth aspect of the present invention is a GPS management method for managing a GPS receiver that receives navigation messages from a plurality of satellites and measures the location of the GPS receiver corresponding to the navigation messages and for downloading the navigation messages received from the satellites, comprising the steps of transmitting a control signal to the GPS receiver so as to control the GPS receiver, and receiving navigation messages with time information at which the navigation messages were extracted from the GPS receiver.

A sixth aspect of the present invention is a location messaging method of a system having a GPS receiver for receiving navigation messages from a plurality of satellites and measuring the location of the GPS receiver corresponding to the received navigation messages, and a GPS management station, the location messaging method comprising the steps of causing the GPS receiver to receive signals from the satellites, extract navigation messages from the signals, and measure the location of the GPS receiver corresponding to the extracted navigation messages, causing the GPS receiver to add time information at which each of the navigation messages was extracted to the relevant navigation message and transmit the resultant data to the outside of the GPS receiver, causing the GPS management station to transmit a control signal to the GPS receiver so as to control the GPS receiver, and causing the GPS management station to receive navigation messages with time information at which the navigation messages were extracted from the GPS receiver.

A seventh aspect of the present invention is a location messaging method of a system having a GPS receiver for receiving navigation messages from a plurality of satellites and measuring the location of the GPS receiver corresponding to the received navigation messages, a GPS management station, and an information unit, the location managing method comprising the steps of causing the GPS receiver to receive signals from the satellites, extract navigation messages from the signals, and measure the location of the GPS receiver corresponding to the extracted navigation messages, causing the GPS receiver to add time information at which each of the navigation messages was extracted to the relevant navigation message and transmit the resultant data to the outside of the GPS receiver, causing the GPS management station to transmit a control signal to the GPS receiver so as to control the GPS receiver, causing the GPS management station to receive navigation messages with time information at which the navigation messages were extracted from the GPS receiver, and causing the GPS management station to transmit the location information of the GPS receiver corresponding to the navigation messages to the information unit.

As described above, the GPS receiver according to the present invention measures the location thereof corresponding to navigation messages received from satellites and transmits the navigation messages to the outside along with time information of the navigation messages. Thus, the receiving side of the navigation messages can compensate the measured results corresponding to the time information. Consequently, the receiving side can more accurately obtain the position information.

In addition, since the GPS management station according to the present invention transmits a control signal to the GPS receiver, the GPS management station can remotely controls the GPS receiver.

In the location messaging system according to the present invention, the GPS receiver measures the location thereof corresponding to navigation messages received from satellites and transmits the navigation messages to the outside along with time information of the navigation messages. The GPS management station that manages the GPS receiver receives the navigation messages and the time information thereof and transmits a control signal to the GPS receiver. Thus, the GPS management station can compensate the measured results of the GPS receiver corresponding to the received time information. In addition, the GPS management station can remotely control the GPS receiver.

In the location messaging system according to the present invention, the GPS receiver measures the location thereof corresponding to navigation messages received from satellites and transmits the navigation messages to the outside along with time information of the navigation messages. The GPS management station that manages the GPS receiver receives the navigation messages and the time information thereof and transmits a control signal to the GPS receiver. In addition, the GPS management station communicates with an external information unit. Thus, the GPS management station can compensate the measured results of the GPS receiver corresponding to the received time information. In addition, the GPS management station can remotely controls the GPS receiver corresponding to communication with the information unit. Moreover, the GPS management station can transmit the measured results to the information unit.

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 3A and 3B are tables showing examples of commands exchanged as a DTMF signal between the GPS receiver and a management center;

DETAILED DESCRIPTION OF THE PREFERRED EMBODIMENTS

Figure 1:
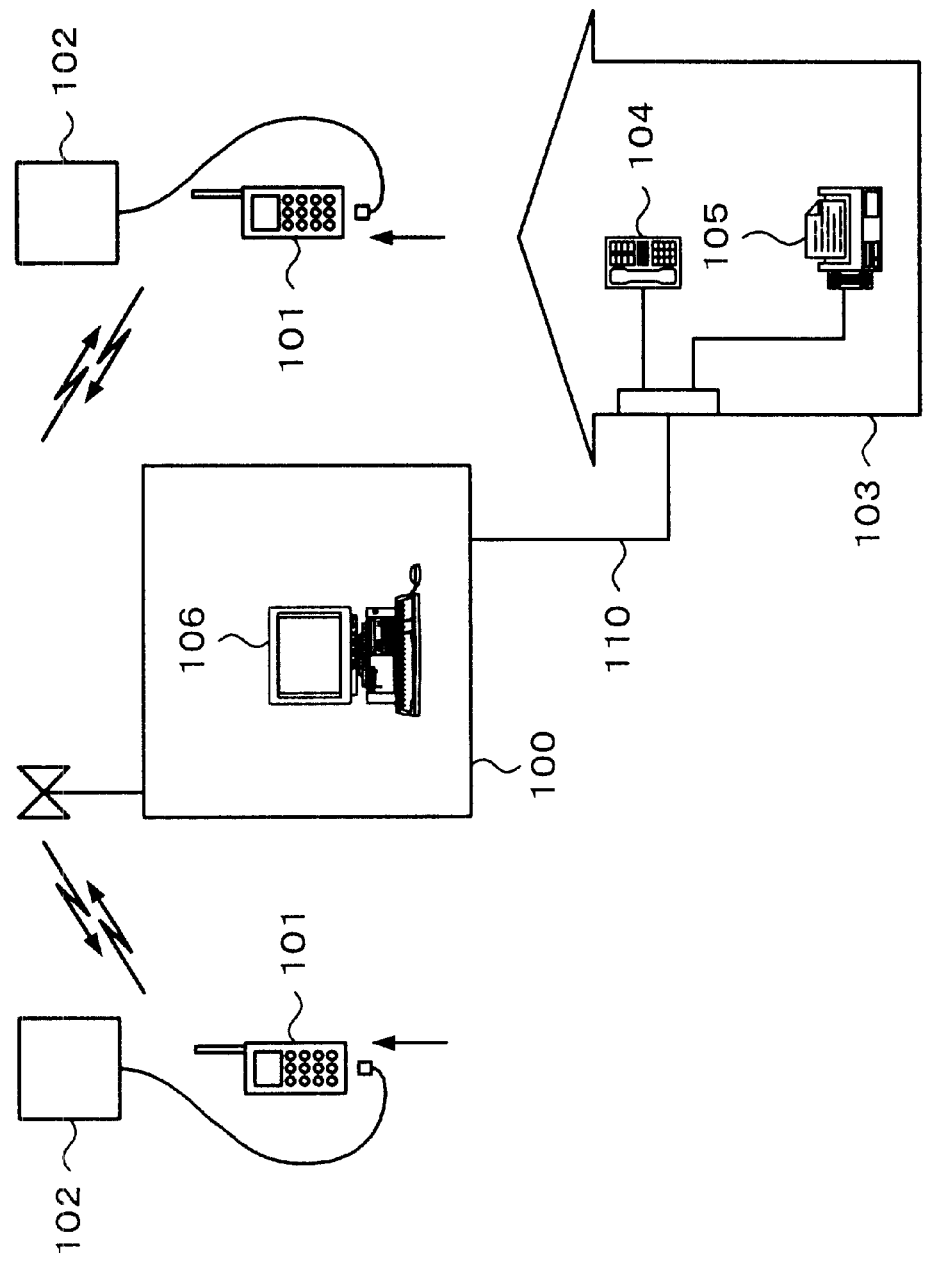
FIG. 1 is a schematic diagram showing an outlined structure of a location messaging system according to the present invention.

Next, with reference to the accompanying drawings, an embodiment of the present invention will be described. FIG. 1 shows an outlined structure of a location messaging system according to the present invention. Referring to FIG. 1, a management system 100 manages the entire system. The management center 100 receives signals such as almanac data and ephemeris data from GPS satellites and downloads these signals any time. The almanac data and ephemeris data that are received and downloaded are recorded and stored as navigation messages. The center 10 and portable telephone terminals 101, 101, . . . are radio communicated with digital signals or analog signals.

A detachable GPS receiver 102 is connected to the portable telephone terminal 101. The GPS receiver 102 receives signals such as almanac data and ephemeris data from a GPS satellite and downloads these signals. In the embodiment of the present invention, the GPS receiver 102 has a function for transmitting/receiving data as a DTMF signal through the portable telephone terminal 101. The power of the GPS receiver 102 is turned on/off with a control signal received from the portable telephone terminal 101. The portable telephone terminal 101 has an automatic call receiving function.

A telephone unit 104 is disposed in a building 103 that is for example a standard house. A facsimile unit 105 is preferably disposed in the building 103 so as to receive image data. The telephone unit 104 and the facsimile unit 105 are connected to the management center 100 through a public telephone line 110.

In this system, location information of the portable telephone terminals 101, 101, . . . can be obtained in the home building 103 at any time. As an example, the case that user A in the building 103 wants to know the location of user B who has the portable telephone terminal 101 will be described.

It is assumed that the portable telephone terminal 101 of the user B is always connected to the GPS receiver 102. The user A in the building 103 communicates with the management center 100 with the telephone unit 104 and requests the management center 100 for the location information of the user B. In the management center 100 that receives the request, for example a computer 106 manages information of the portable telephone terminals 101, 101, . . . , Corresponding to the management information, the management center 100 calls the portable telephone terminal 101 of the user B and transmits a location information transmission request to the portable telephone terminal 101. In this embodiment, the location information transmission request is transmitted as a DTMF signal.

Corresponding to the location information transmission request received by the portable telephone terminal 101, the power of the GPS receiver 102 is turned on. Thus, the GPS receiver 102 obtains the current location as GPS information. In addition to the obtained current location information is transmitted as a DTMF signal to the management center 100 along with time information of the obtained location information. After the current location information is transmitted, the power of the GPS receiver 102 is turned off. Thereafter, the line between the portable telephone terminal 101 and the management center is disconnected.

On the other hand, the management center 100 receives the location information and the time information thereof from the portable telephone terminal 101. The management center 100 correlates the location information with map information (location detail information) stored in the computer 106 and matches the location information with the map information. In addition, with the time information, the management center 100 can correct an error of the location information. The resultant data is transmitted to the building 103 through the public telephone line 110. Thus, the user A in the building 103 can know the location of the portable telephone terminal 101 of the user B.

The location messaging process can be performed as an audio message to the user A in the building 103 with the telephone unit 104. Alternatively, the location messaging process can be performed with the facsimile unit 105. In this case, the map information is added to the location information. The detail of the location messaging process will be described later.

As described above, according to the present invention, the management center 100 remotely controls the GPS receiver 102 so as to obtain the location information as GPS information. In addition, the management center 100 remotely controls the power of the GPS receiver 102. Thus, when the user B is a prowling aged person, since the portable telephone terminal 101 and the GPS receiver 102 can be always turned on, the user A in the building 103 can always know the location of the user B.

When the portable telephone terminal 101 and the GPS receiver 102 are disposed to a particular car, if the car is stolen, it can be tracked.

In the above-described example, the user A communicates with the management center 100 so as to know the location of the user B. However, the present invention is not limited to such an example. For example, the user A can set a designated area to the portable telephone terminal 101. Thus, when the GPS receiver 102 connected to the portable telephone terminal 101 periodically obtains the location of the GPS receiver 102, if the portable telephone terminal 101 is in or out of the designated area, the management center 100 can inform the user A that the portable telephone unit 101 is in or out of the designated area.

Figure 2:
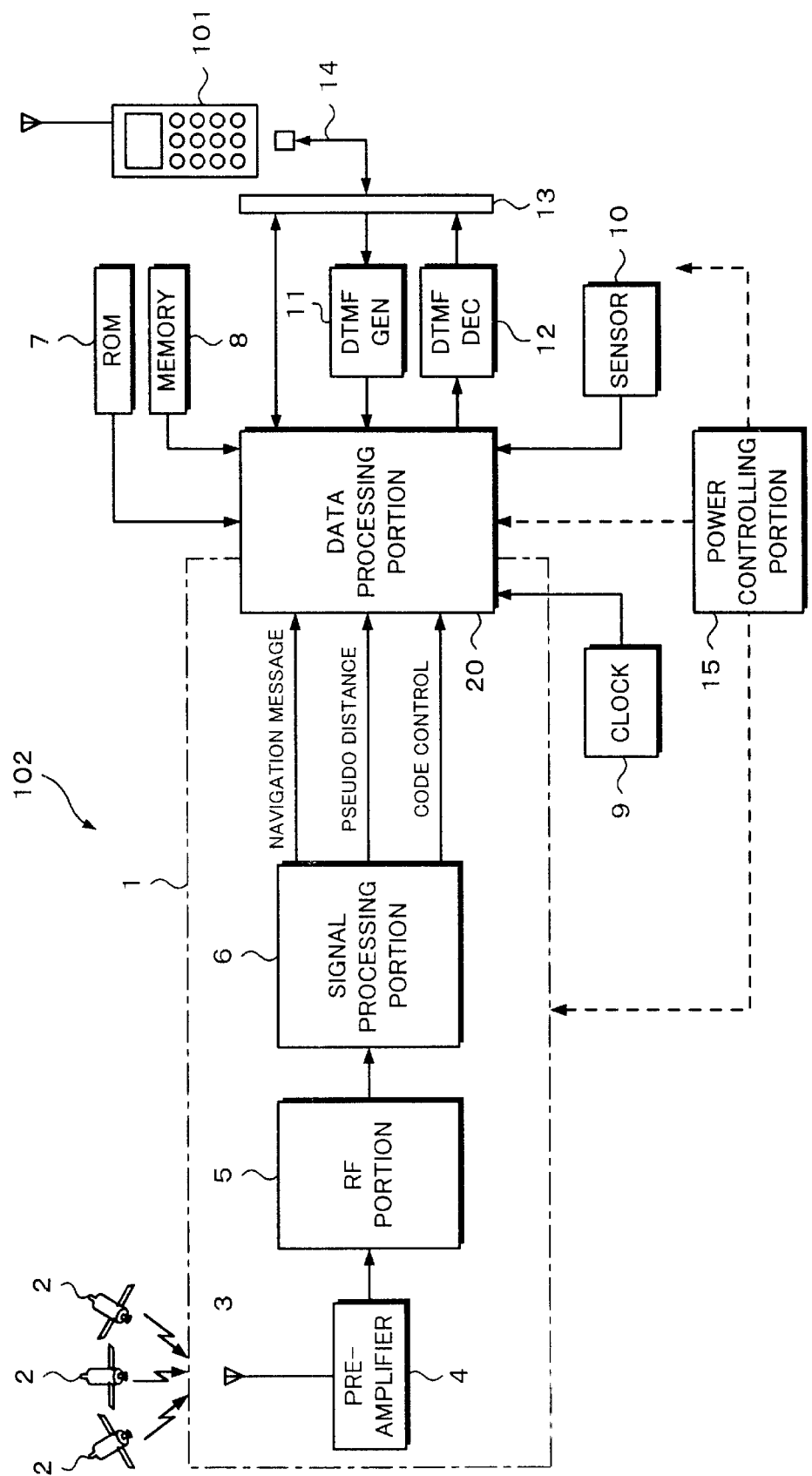
FIG. 2 is a block diagram showing an example of the structure of a GPS receiver.

FIG. 2 shows an example of the structure of the GPS receiver 102. The GPS receiver 102 is connected to the portable telephone terminal 101 with for example a connector through a cable 14. A serial signal and a DTMF signal are exchanged between the GPS receiver 102 and the portable telephone terminal 101 through the terminal 13 and the cable 14.

The data processing portion 20 is composed of for example a microprocessor. The data processing portion 20 is connected to a ROM 7, a memory 8, a clock 9, and so forth. The ROM 7 stores program data and an unique ID of the GPS receiver 102. The memory 8 is composed of a RAM that is backed up by a battery (not shown). Parameters of the GPS receiver 102, navigation messages, and so forth are temporarily stored in the memory 8. The clock 9 supplies the current time to the data processing portion 20. The clock 9 can compensate the time corresponding to a navigation message.

The receiving portion 1 receives data from satellites 2, 2, 2, . . . . Signals transmitted from the satellites 2, 2, 2, . . . are received by an antenna 3. Received signals are supplied from the antenna 3 to an RF portion 5 through a pre-amplifier 4. The RF portion 5 converts radio frequencies of the received signals into intermediate frequencies. The resultant signals are supplied to a signal processing portion 6.

The signal processing portion 6 demodulates the received signals and extracts navigation messages composed of for example almanac data and ephemeris data that are used to measure the location of the GPS receiver 102. Corresponding to the extracted information, the signal processing portion 6 calculates the pseudo distance. Information such as navigation messages and pseudo distance data is supplied to the data processing portion 20 and stored to the memory 8. The memory 8 also stores time information (time stamp) of each navigation message. The signal processing portion 6 is controlled with a control code received from the data processing portion 20.

A serial signal is exchanged between the portable telephone terminal 101 and the data processing portion 20 through the cable 14. The DTMF signal is supplied from the portable telephone terminal 101 to a DTMF decoder 11. The DTMF decoder 11 decodes the DTMF signal. The decoded DTMF signal is supplied as a relevant command and data to the data processing portion 20. A command and data that are output from the data processing portion 20 are supplied to a DTMF generator 12. The DTMF generator 12 generates a DTMF signal corresponding to the command and data. The generated DTMF signal is supplied to the portable telephone terminal 101 through the cable 14. When a digital portable telephone terminal is used, the DTMF signal is supplied to a DTMF signal converter for a digital network through the cable 14. The DTMF signal converter converts the DTMF signal into a digital signal corresponding to the DTMF signal.

Next, the transmitting/receiving characteristics of the DTMF signal will be described. When the DTMF signal is transmitted, the transmission time and the stop time of the DTMF signal generated by the DTMF generator 12 under the control of the data processing portion 20 are 112 msec each. The transmission time and the stop time of the DTMF signal are set corresponding to the fluctuation of the quality of an audio signal due to the condition of a radio wave that is a characteristic of a portable telephone system and corresponding to electronic communication terminal engineering standard in consideration of the transmission power of the DTMF signal, the duty ratio of the transmission time/ stop time, and the transmission time of one phrase. A signal that is transmitted to the portable telephone terminal 101 through the cable 14 is attenuated by an attenuator portion (not shown) and output with a constant level. The maximum power and the average power of the transmission power of the DTMF signal are −50.3 dBm and −56.1 dBm, respectively.

When the DTMF signal is received, it is supplied from the portable telephone terminal 101 to the GPS receiver 102 through the cable 14. The supplied DTMF signal is decoded by the DTMF decoder 11 into a four-bit code. The resultant signal is supplied to the data processing portion 20. The data processing portion 20 monitors whether or not the DTMF signal is supplied every 16 msec. When the DTMF signal is supplied to the data processing portion 20, it reads the data and performs an operation corresponding to the received DTMF signal sequence.

Since the DTMF signal is transmitted through a radio portable telephone or the like, part of the DTMF signal sequence may be lost. Thus, in the embodiment of the present invention, when the management center 100 normally receives the DTMF signal from the portable telephone terminal 101, the management center 100 sends back a call reception signal to the portable telephone terminal 101. The call reception signal represents that the management center 100 has normally received the DTMF signal sequence.

In a predetermined time period after the portable telephone terminal 101 has transmitted the DTMF signal to the management center 100, if it has not sent back the termination signal to the portable telephone terminal 101, it re-transmits the DTMF signal to the management center 100.

On the other hand, when the management center 100 receives a DTMF signal sequence, if a part thereof has been lost, the management center 100 transmits a retransmission request command to the portable telephone terminal 101. The lost portion of the DTMF signal sequence is detected using the fact that the length of each DTMF signal sequence is constant. When the length of a received DTMF signal sequence does not match the predetermined value, the management center 100 determines that part of the received DTMF signal sequence has been lost.

In the embodiment of the present invention, if an error takes place because part of a received DTMF signal is lost, whenever the DTMF signal is retransmitted, it is redundantly transmitted a number of times corresponding to the number of re-transmission times. Thus, the reliability of the DTMF signal improves. In reality, in the first transmission session, one record of a fixed length DTMF signal is transmitted. In the first re-transmission session (namely, in the second transmission session), two records are transmitted. In the second re-transmission session (namely, in the third transmission session), three records are transmitted.

Thus, corresponding to the occurrence probability of an error of a DTMF signal that is communicating, the redundancy of the DTMF signal can be dynamically increased. Consequently, the reliability of the communication can be compensated. In addition, when the communication condition is good, the redundancy can be suppressed. Thus, the communication time and reliability can be optimized corresponding to the communication conditions.

A sensor 10 that detects a shock or a heartbeat of the user may be disposed in the structure of the GPS receiver 102 shown in FIG. 2. For example, when the sensor 10 detects a shock that exceeds a predetermined level or the stop of the heartbeat of the user, a predetermined detection signal is supplied to the data processing portion 20.

FIG. 3 shows examples of commands exchanged as a DTMF signal between the GPS receiver 102 and the management center 100. FIG. 3A shows commands transmitted from the management center 100 to the GPS receiver 102. FIG. 3B shows commands transmitted from the GPS receiver 102 to the management center 100. Each command is composed of a symbol [#] or [*] and a two-digit number. The two-digit number represents the type of the command. If necessary, the two-digit number is followed by a parameter.

To cause the GPS receiver to measure the location information thereof and to transmit the measured location information to the management center 100, the management center 100 transmits command [#01] to the GPS receiver 102 through the portable telephone terminal 101. In addition, as shown in FIG. 3A, the management center 100 can change settings of the GPS receiver 102 with these commands. Moreover, as shown in FIG. 3B, the GPS receiver 102 can request the management center 100 for almanac data and ephemeris data measured by the management center 100.

Figure 4:
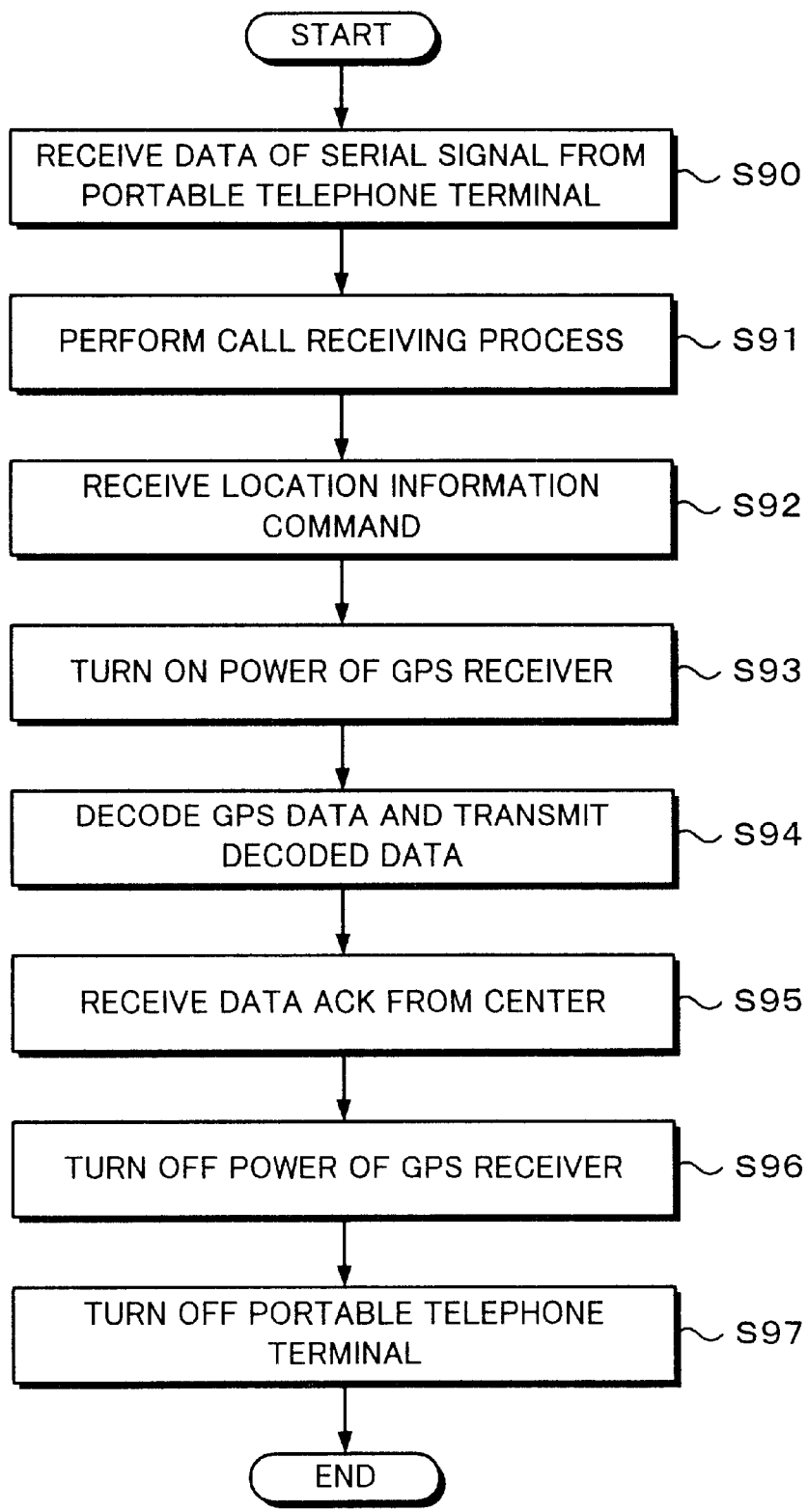
FIG. 4 is a flow chart showing a power controlling process of the GPS receiver.
Figures 5, 5A, 5B:
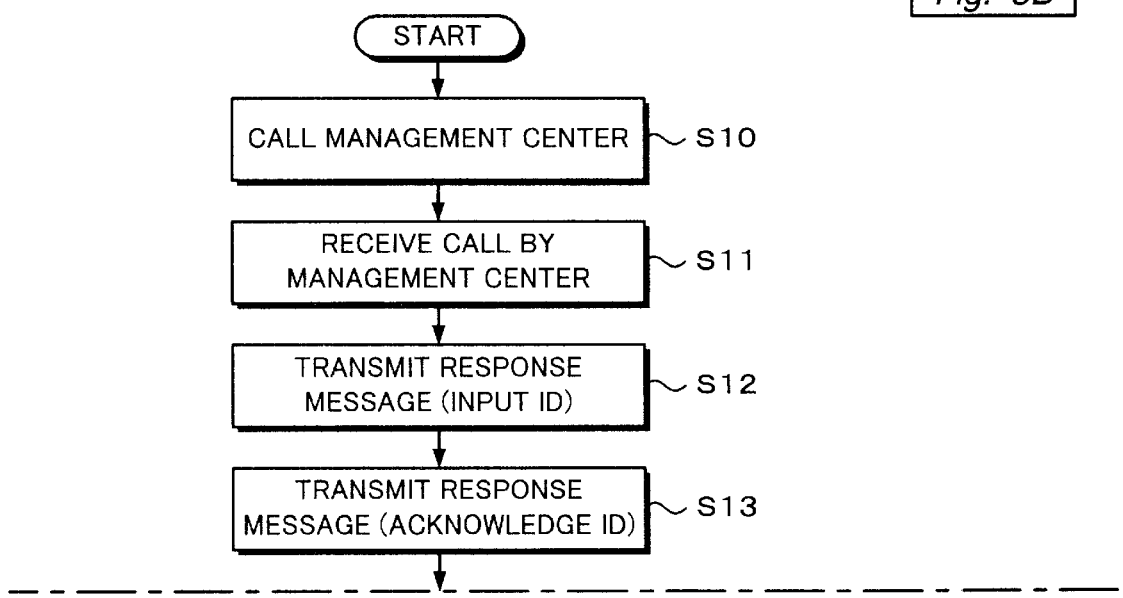
FIGS. 5A and 5B are first parts of a flow chart for explaining a location information obtaining process remotely performed for the GPS receiver.
Figure 5B:
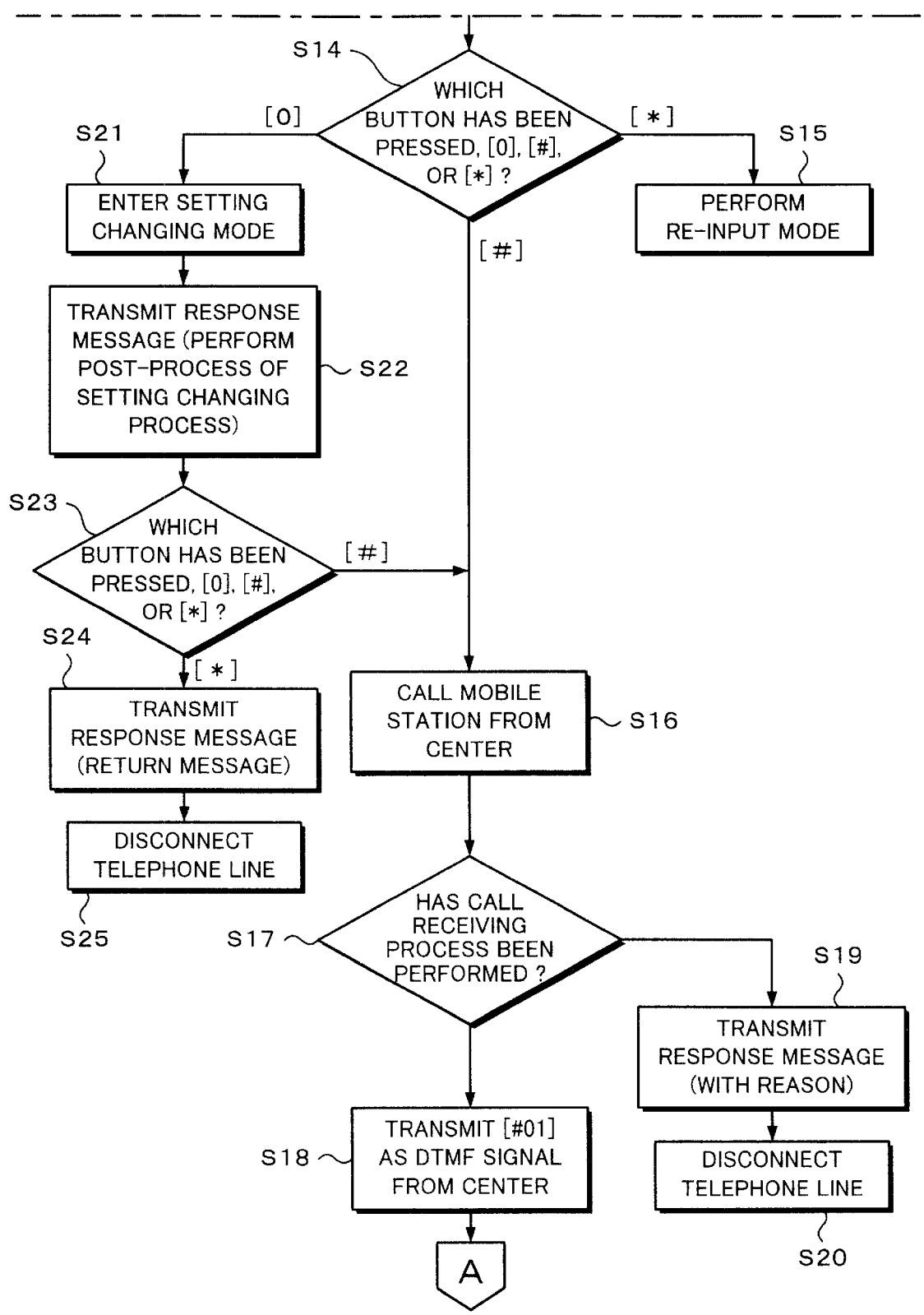
Figure 6A:
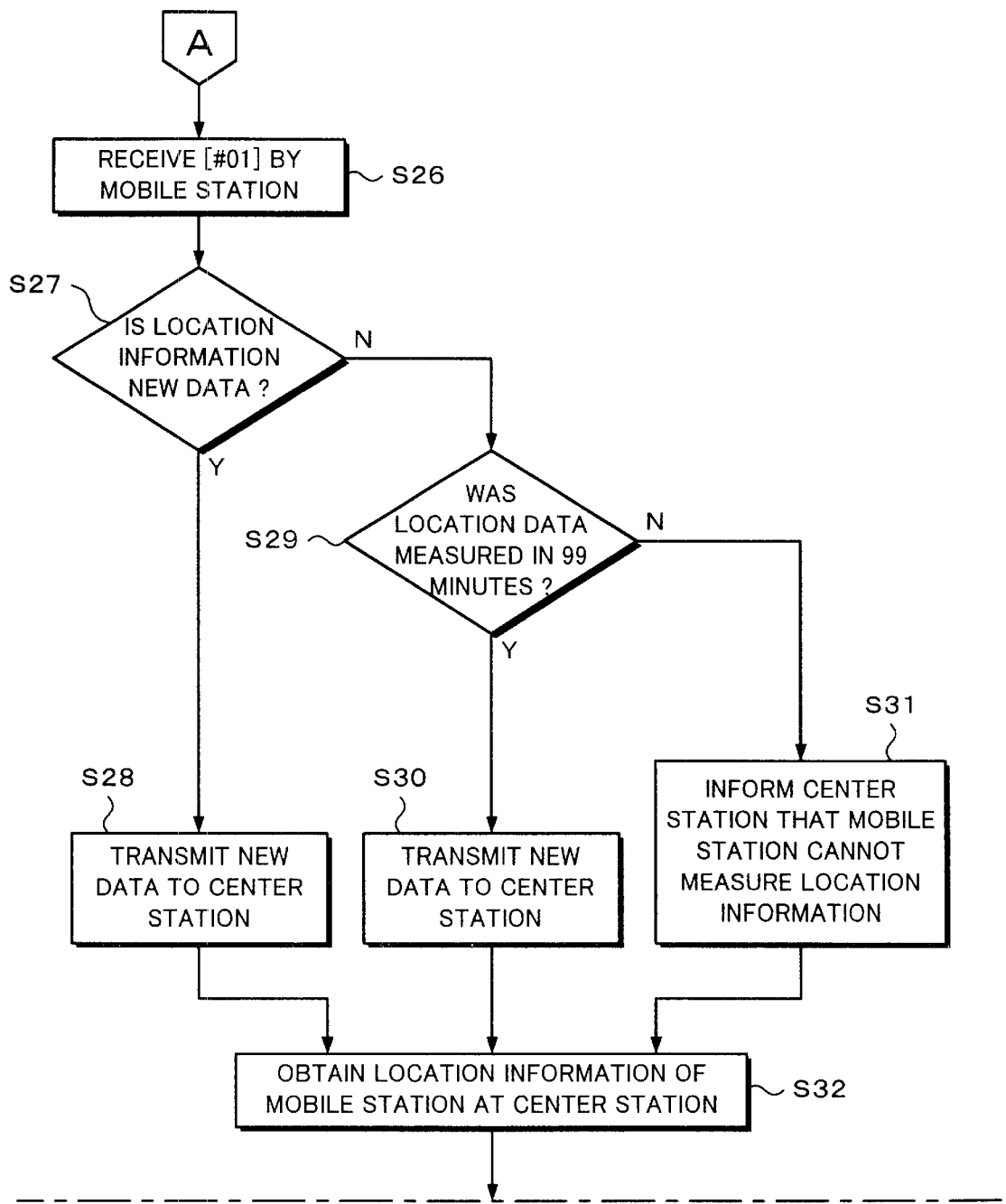
FIGS. 6A and 6B are second parts of the flow chart shown in FIGS. 5A and 5B.
Figure 6B:
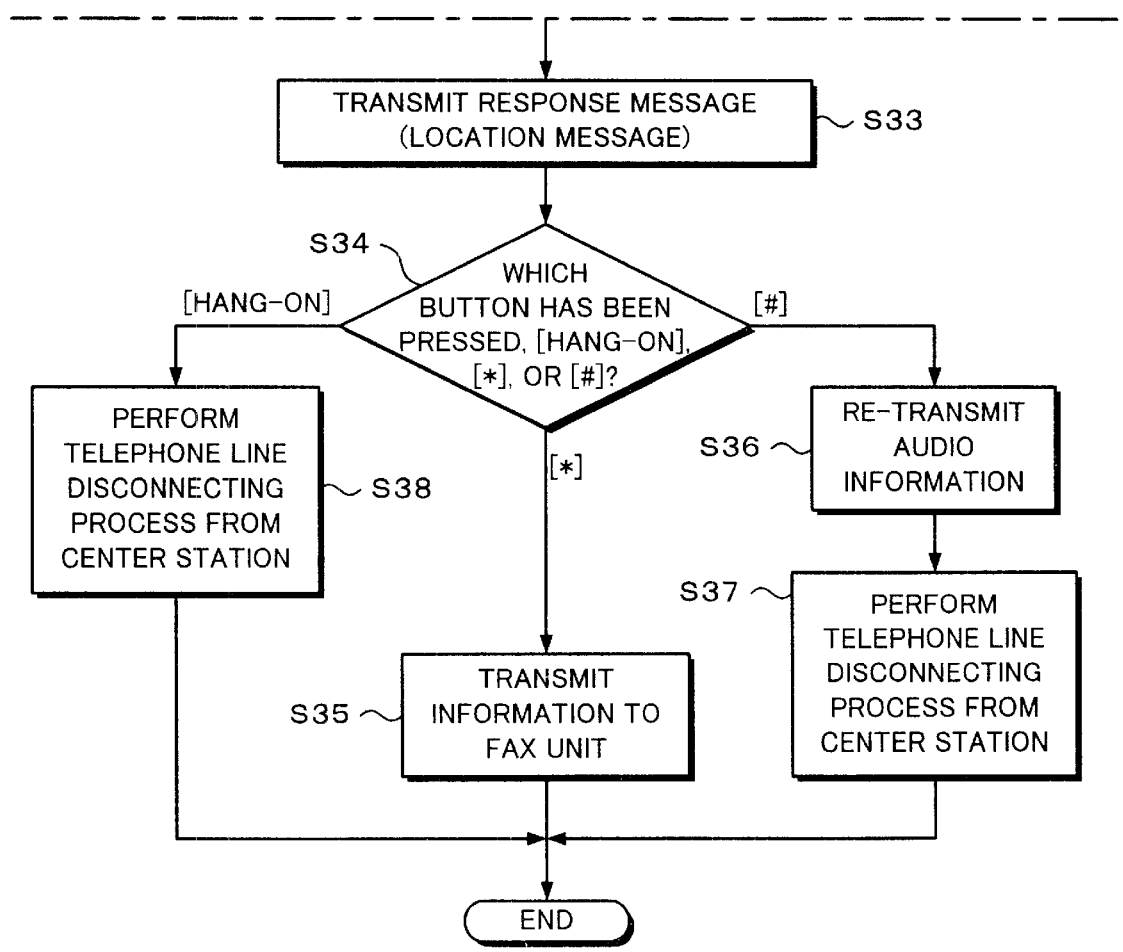

As described above, the power of the GPS receiver 102 is turned on/off with a serial signal received from the portable telephone terminal 101. FIG. 4 is a flow chart showing a power controlling process of the GPS receiver 102. When the power of the GPS receiver 102 has been turned off, a serial signal that represents that a call has been received is supplied from the portable telephone terminal 101 to the data processing portion 20 (at step S90). At step S91, the data processing portion 20 supplies a call reception command as a serial signal to the portable telephone terminal 101.

At step S92, a location messaging command transmitted from the management center 100 is received by the portable telephone terminal 101. In this embodiment, the location messaging command is transmitted as a DTMF signal. For example, the location messaging command is transmitted as [#01]. The received command is supplied to the data processing portion 20.

At step S93, when the data processing portion 20 receives the command, the data processing portion 20 generates a power control signal that causes the power of the entire GPS receiver 102 to be turned on. The power control signal is supplied to a power controlling portion 15. When the power controlling portion 15 receives the control signal, the power controlling portion 15 supplies the power to each portion of the GPS receiver 102. Thus, the power of the GPS receiver 102 is turned on.

Even if the power of the GPS receiver 102 is turned off, the power is supplied to portions that control the power supply with for example a backup battery. For example, the power is always supplied to the power controlling portion 15, a part of the data processing portion, the DTMF decoder 11, the clock 9, and so forth.

When the power of the GPS receiver 102 is turned on, the location thereof is measured. Signals are received from satellites and decoded. Thus, navigation messages are obtained. A pseudo distance is calculated corresponding to the obtained navigation messages. The navigation messages and the pseudo distance are supplied to the data processing portion 20 and stored in the memory 8. In addition, the navigation messages and the pseudo distance are supplied from the data processing portion 20 to the DTMF generator 12. The DTMF generator 12 generates a DTMF signal corresponding to the received data. The generated DTMF signal is supplied to the portable telephone terminal 101. The portable telephone terminal 101 transmits the generated DTMF signal to the management center 100 (at step S94).

When the management center 100 receives the location data, the management center 100 transmits data ACK to the portable telephone terminal 101. The data ACK represents that the management center 100 has received the location data. When the portable telephone terminal 101 receives the data ACK, the portable telephone terminal 101 supplies the data ACK as a serial signal to the data processing portion 20 (at step S95). Thus, the data processing portion 20 generates a power control signal that causes the power of the GPS receiver 102 to be turned off. The power control signal is supplied to the power controlling portion 15. The power controlling portion 15 turns off the power of the GPS receiver 102 except for parts thereof (at step S96). In addition, the power control signal causes the portable telephone terminal 101 to enter an idling state.

Next, with reference to flow charts shown in FIGS. 5A to 6B, a location information obtaining process for remotely controlling the GPS receiver 102 and obtaining the location information therefrom will be described. In the example, it is assumed that the user A in the building 103 obtains the current location of the user B who has the portable telephone terminal 101 and the GPS receiver 102. Letter "A" in FIGS. 5A to 6B represent that the process continues from "A" in FIGS. 5A and 5B to "A" in FIGS. 6A and 6B. In the process shown in FIGS. 5A to 6B, the power is controlled as described in FIG. 4. However, for simplicity, the description of the power controlling process will be omitted.

First of all, the user A calls the management center 100 with the telephone 104 so as to request the management center 100 for the location information of the user B (at step S10). When the management center 100 receives the call (at step S11), the management center 100 transmits a response message to the telephone unit 104 so as to prompt the user A for the ID or the telephone number of the portable telephone terminal 101 of the user B. The response message is an audio message for example "This is OX Location Information Message Service. Please enter the ID or telephone number of the desired mobile station and then press the button [#].". Thereafter, the mobile station means the portable telephone terminal 101.

When the user A enters the ID or telephone number of the portable telephone terminal 101 and presses the button [#], the management center 100 transmits a response message to the telephone unit 104 so as to prompt the user A for the acknowledgment of the entered contents (at step S13). The response message is an audio message for example "Be sure that the desired mobile station ID is XXXX. If correct, press the button [#]. If not correct, press the button [*]. To change the setting of the mobile station, enter [0].

At step S14, the data processing portion 20 determines what button the user A has pressed with the telephone unit 104. When the user A has pressed the button [*] at step S14, the flow advances to step S15 for the ID or telephone number re-entry mode. At step S15, the flow returns to step S12. When the user has pressed the button [#] at step S14, the flow advances to step S16 for a location information obtaining process. When the user A has entered [0] at step S14, the flow advances to step S21 (the process at step S21 will be described later).

At step S16, the management center 100 calls the portable telephone terminal 101 (mobile station). At step S17, a predetermined call receiving process is performed between the management center 100 and the portable telephone terminal 101. The management center 100 determines whether or not the call has been received by the portable telephone terminal 101.

When the determined result at step S17 is No (namely, the call has not been received by the portable telephone terminal 101), the flow advances to step S19. At step S19, the management center 100 transmits a response message to the telephone unit 104 of the user A. The response message represents that the call has not been received by the portable telephone terminal 101 of the user B in addition to the reason thereof. The response message is an audio message for example "The mobile station for the location information message request is now out of the service area or the power has been turned off. Call again later.". Thereafter, the flow advances to step S20. At step S20, the management center 20 performs the telephone line disconnecting process.

When the determined result at step S17 is Yes (namely, the call has been received), the flow advances to step S18. At step S18, since the GPS receiver 102 has prepared to measure the location information, the management center 100 transmits for example command "#01" as a DTMF signal to the GPS receiver 102 so as to cause the GPS receiver 102 to measure the location information.

Thereafter, the flow advances to step S26. At step S26, the command "#01" as a DTMF signal transmitted from the management center 100 is received by the mobile station (namely, the portable telephone terminal 101). The portable telephone terminal 101 supplies the received DTMF signal to the GPS receiver 102. In the GPS receiver 102, the received DTMF signal is decoded by the DTMF decoder 11. The decoded signal is supplied to the data processing portion 20. Corresponding to the decoded signal, the data processing portion 20 generates a control code for controlling the receiving portion 1 corresponding to the decoded signal so as to cause the receiving portion 1 to receive a GPS signal and measure the location of the GPS receiver 102.

When the GPS receiver 102 measures the location thereof, it does not always obtain the location information. Since a satellite transmits a signal as a microwave, if the GPS receiver 102 is behind a high-rise building or a mountain, it cannot receive the microwave from the satellite. Thus, since the GPS receiver 102 cannot receive the microwave from the satellite, the GPS receiver 102 cannot measure the location thereof. The measured location data is stored to the memory 8 along with time information (time stamp) thereof. In the embodiment of the present invention, when the GPS receiver 102 cannot measure the location thereof, it reads location data from the memory 8 along with the time information thereof and transmits them to the management center 100.

At step S27, the data processing portion 20 compares the time stamp of the location data and the current time and determines whether or not the location data is the latest data. When the difference between the time of the time stamp and the time of the clock 9 is in a predetermined range, the data processing portion 20 determines that the location information is the latest data. Thereafter, the flow advances to step S28. At step S28, the GPS receiver 102 transmits the latest location data to the management center 100. Thereafter, the flow advances to step S32.

On the other hand, when the determined result at step S27 is No (namely, the location information is not the latest data), the flow advances to step S29. At step S29, the data processing portion 20 determines whether or not the location information was measured in 99 minutes. The range of 99 minutes is just an example. Thus, the present invention is not limited to such a range. When the determined result at step S29 is Yes (namely, the location information was measured in 99 minutes), the flow advances to step S30. At step S30, the GPS receiver 102 transmits the location information to the management center 100. Thereafter, the flow advances to step S32.

On the other hand, when the determined result at step S29 is No (namely, the location information was not measured in 99 minutes), the flow advances to step S31. At step S31, the GPS receiver 102 transmits for example data [] as an DTMF signal to the management center 100. The data [] represents that the GPS receiver 102 cannot measure the location information. Thereafter, the flow advances to step S32.

At steps S28 and S30, the GPS receiver 102 transmits data of for example a 13-digit number or symbol to the management center 100. In other words, the data is composed of symbol " a two-digit number, and a 10-digit number. The two-digit number represents the difference between the current time and the measured time. At step S28, the two-digit number is "00". The 10-digit number represents the location information. At step S28, the two-digit number is "00". At step S30, when the location information was measured five minutes before, the two-digit number is "05". When the location information was measured 99 minutes before, the two-digit number is "99".

After the GPS receiver 102 has transmitted data to the management center 100 at step S28, S30, or S31, the flow advances to step S32. At step S32, the management center 100 receives the data.

At step S33, the management center 100 transmits a response message as the measured result to the telephone unit 104 of the user A. At this point, the computer 106 correlates the measured location information with map information that stored in the computer 106.

In the embodiment of the present invention, the computer 106 searches a landmark around the measured location and transmits landmark information to the telephone unit 104 along with the location information. The response message is an audio message for example "The location information of the mobile station has been obtained. The mobile station is located at OX Intersection at OO:OO. If you need a detailed map through FAX, enter your FAX number, press the button [*], and then hang on the handset. If you need the audio message once again, press the button [#]. Thank you for using our service.".

At step S34, the management center 100 determines what button the user A has pressed with the telephone unit 104. When the user A has pressed the button [#] at step S34, the flow advances to step S36. At step S36, the management center 100 re-transmits the response message to the telephone unit 104 of the user A. Thereafter, the flow advances to step S37. At step S37, the management center 100 performs a telephone line disconnecting process.

On the other hand, when the user A has pressed the button [*] at step S34, the flow advances to step S35. At step S35, the management center 100 transmits the location information as image data to the facsimile unit 105. In this case, the management center 100 transmits image data of which the measured location is marked on a map to the facsimile unit 105.

When the user A has pressed neither the button [#] nor [*] and has hung on the handset at step S34, the flow advances to step S38. At step S38, the management center 100 performs a telephone line disconnecting process.

Next, the process in the case that the user A has entered [0] at step S14 (see FIGS. 5A and 5B) will be described, According to the present invention, the GPS receiver 102 has a data transmitting/receiving function. Thus, the settings of the GPS receiver 102 can be remotely changed. When the user A has entered [0] at step S14, the flow advances to step S21. At step S21, the GPS receiver 102 enters a setting changing mode. The detail of the setting changing mode will be described later.

When the process of the setting changing mode has been normally completed at step S21, the flow advances to step S22. At step S22, the management center 100 transmits a response message to the user. The response message represents the completion of the process and prompts the user A for the selection of the next process. The response message is an audio message for example "The setting has been changed. To obtain the location information of the mobile station, press the button [#]. To exit the setting changing mode, press the button [*].".

At step S23, the management center 100 determines whether the user A has pressed the button [#] or the button [*]. When the user A has pressed the button [#] at step S23, the flow returns to step S16. At step S16, the management center 100 calls the portable telephone terminal 101 (mobile station) and enters a location information obtaining process.

On the other hand, when the user A has pressed the button [*] at step S23, the flow advances to step S24. At step S24, the management center 100 transmits a response message to the telephone unit 104 of the user A. The response message represents that the service has been completed. The response message is an audio message for example "Thank you for using the our service.". Thereafter, the flow advances to step S24. At step S24, the management center 100 performs a telephone line disconnecting process.

Figure 7:
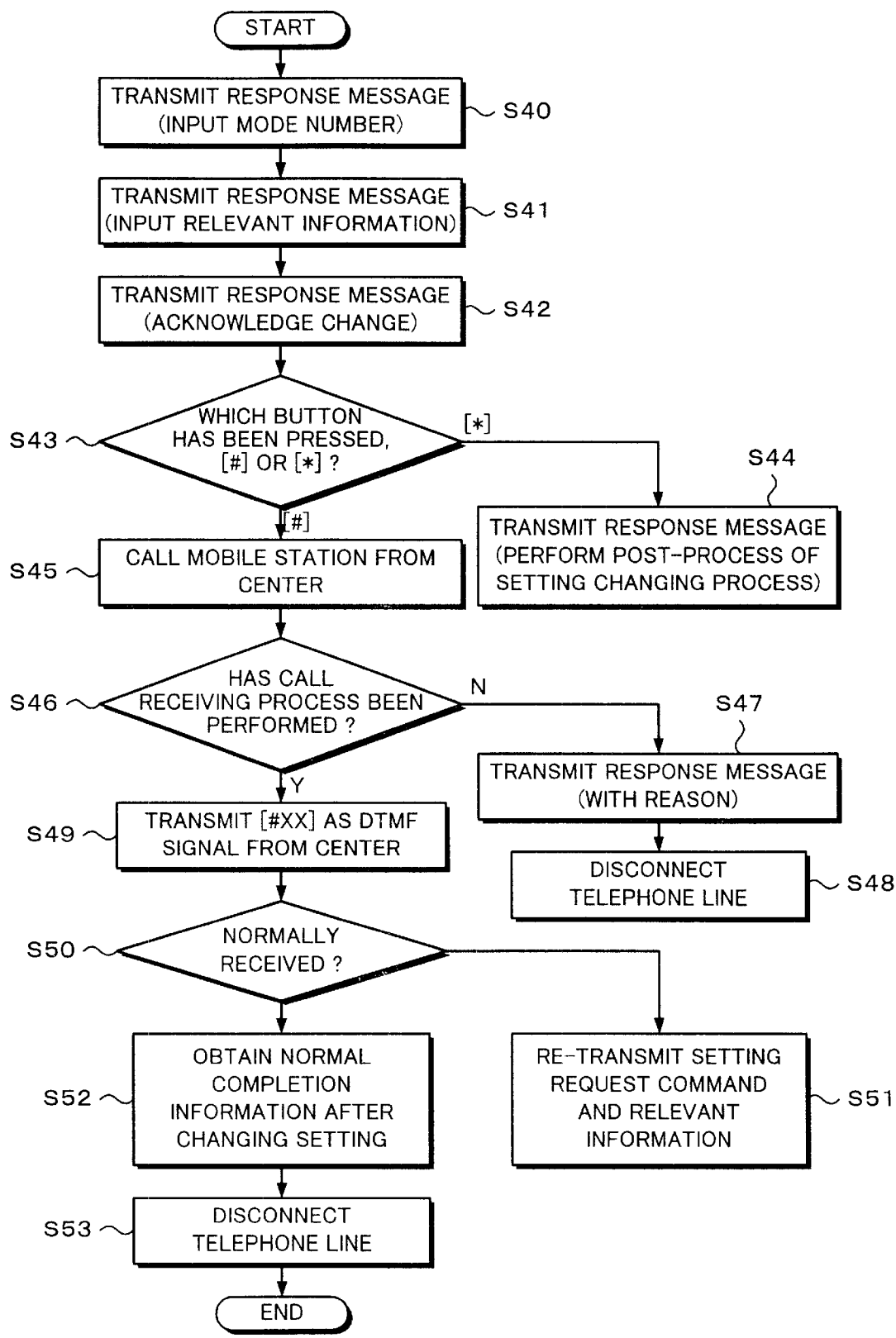
FIG. 7 is a flow chart showing a setting changing mode of the GPS receiver.

FIG. 7 is a flow chart showing the process of the setting changing mode at step S21. When the GPS receiver 102 enters the setting changing mode, it transmits a response message to the telephone unit 104 of the user A so as to prompt the user A for the selection of the setting changing mode (at step S40). The response message is an audio message for example "Select the setting changing mode, enter the desired mode number, and then press the button [#].". When the user A presses a desired button with the telephone unit 104, he or she can select any desired mode corresponding to a relevant mode number shown in FIG. 3.

Thereafter, the flow advances to step S41. At step S41, the management center 100 transmits a response message to the telephone unit 104 of the user A so as to prompt the user A for the input of an item to be changed. The response message is an audio message for example "The setting of OO will be changed. Enter data to be changed and then press the button [#].". The user A inputs desired data with the telephone unit 104.

When the user A has pressed the button [#], the flow advances to step S42. At step S42, the management center 100 transmits a response message to the telephone unit 104 of the user A so as to prompt the user A for the acknowledgment of the change of the setting. The response message is an audio message for example "The setting of OO will be changed to XX. To confirm, press the button [#]. To cancel, press the button [*].".

At step S43, the management center 100 determines whether the user has pressed the button [*] or the button [#].". When the user has pressed the button [*] at step S43, the flow advances to step S44. At step S44, the management center 100 transmits a response message to the telephone unit 104 of the user A so as to prompt the user A for the post-process of the setting changing process. The response message is an audio message for example "To change the setting again, enter [0]. To obtain the location information of the mobile station, press the button [#]. To exit the setting changing mode, press the button [*]."

The management center 100 determines what data the user A has entered with the telephone unit 104 (this process is not shown in FIG. 7). When the user A has entered [0], the flow returns to for example step S40. When the user A has pressed the button [#] at step S43, the flow exits from the flow chart shown in FIG. 7 and advances to step S16 shown in FIGS. 5A and 5B. When the user A has pressed the button [*] at step S43, the management center 100 performs a telephone line disconnecting process.

On the other hand, when the user A has pressed the button [#] at step S43, the flow advances to step S45. At step S45, the management center 100 calls the portable telephone terminal 101 (mobile station). At step S46, the management center 100 performs a call receiving process for the portable telephone terminal 101 and determines whether or not the portable telephone terminal 101 has received the call.

When the determined result at step S46 is No (namely, the portable telephone terminal 101 has not received the call), the flow advances to step S47. At step S47, the management center 100 transmits a response message to the telephone unit 104 of the user A. The response message represents that the portable telephone terminal 101 has not received the call in addition to the reason thereof. The response message is an audio message for example "The mobile station for the location information message request is out of the service area or the power has been turned off. The setting cannot be changed. Please call again later.". At step S48, the management center 100 performs a telephone line disconnecting process.

On the other hand, when the determined result at step S46 is Yes (namely, the portable telephone terminal 101 has received the call), the flow advances to step S49. At step S49, the GPS receiver 102 has prepared to measure the location information thereof. The management center 100 transmits a setting change command and relevant information (namely, the changed command) to the GPS receiver 102.

At step S50, the management center 10 determines whether or not the GPS receiver 102 has correctly received the command. Namely, the management center 100 determines whether or not it has received setting change normal completion information from the GPS receiver 102. When the determined result at step S50 is Yes (namely, the GPS receiver 102 has correctly received the command), the flow advances to step S52. At step S52, the management center 100 receives the setting change normal completion information from the GPS receiver 102. At step S53, the management center 100 performs a telephone line disconnecting process.

When the determined result at step S50 is No (namely, the GPS receiver 102 has not correctly received the command), the flow advances to step S51. At step S51, the management center 100 re-transmits the setting request command and the relevant information to the GPS receiver 102. In this case, the flow may return to step S49.

Almanac data of navigation messages is data of coarse orbital information and time information of all satellites used by the GPS system. Once almanac data is received, it can be used for around one week. Almanac data is updated at least once every six days. With such data, satellite navigation information is coarsely calculated. With the calculated results, a satellite observation plan is made so as to measure the location of the GPS receiver.

On the other hand, ephemeris data is orbit information of observation satellites. The location of a satellite can be obtained with an accuracy of around 100 m. Once ephemeris data is obtained, it can be used for one and half hours. Thus, the ephemeris data is updated at least once every hour. With the ephemeris data, the location of a satellite is obtained so as to measure the location of the GPS receiver.

To measure the location of the GPS receiver 102, both the almanac data and the ephemeris data should be received. However, to receive the almanac data, it takes around 20 minutes. Thus, depending on the receiving condition of radio waves from a satellite, the location measuring calculation may not be easily performed. For example, in an emergency situation, the required location information may not be obtained.

Thus, according to the present invention, the management center 100 stores the latest navigation message and difference information at each time point. The management center 100 checks the time stamp of a navigation message received by the GPS receiver 102 and transmits relevant difference information to the GPS receiver 102. Thus, the GPS receiver 102 can quickly perform the location measuring calculation.

In other words, in the location messaging system according to the present invention, the management center 100 also downloads navigation messages from satellites. When the elapsed time of a navigation message downloaded by the GPS receiver 102 exceeds a predetermined value, the management center 100 transmits the difference between the old data of the GPS receiver 102 and the data downloaded to the management center 100 to the GPS receiver 102 through the portable telephone terminal 101.

Figure 8:
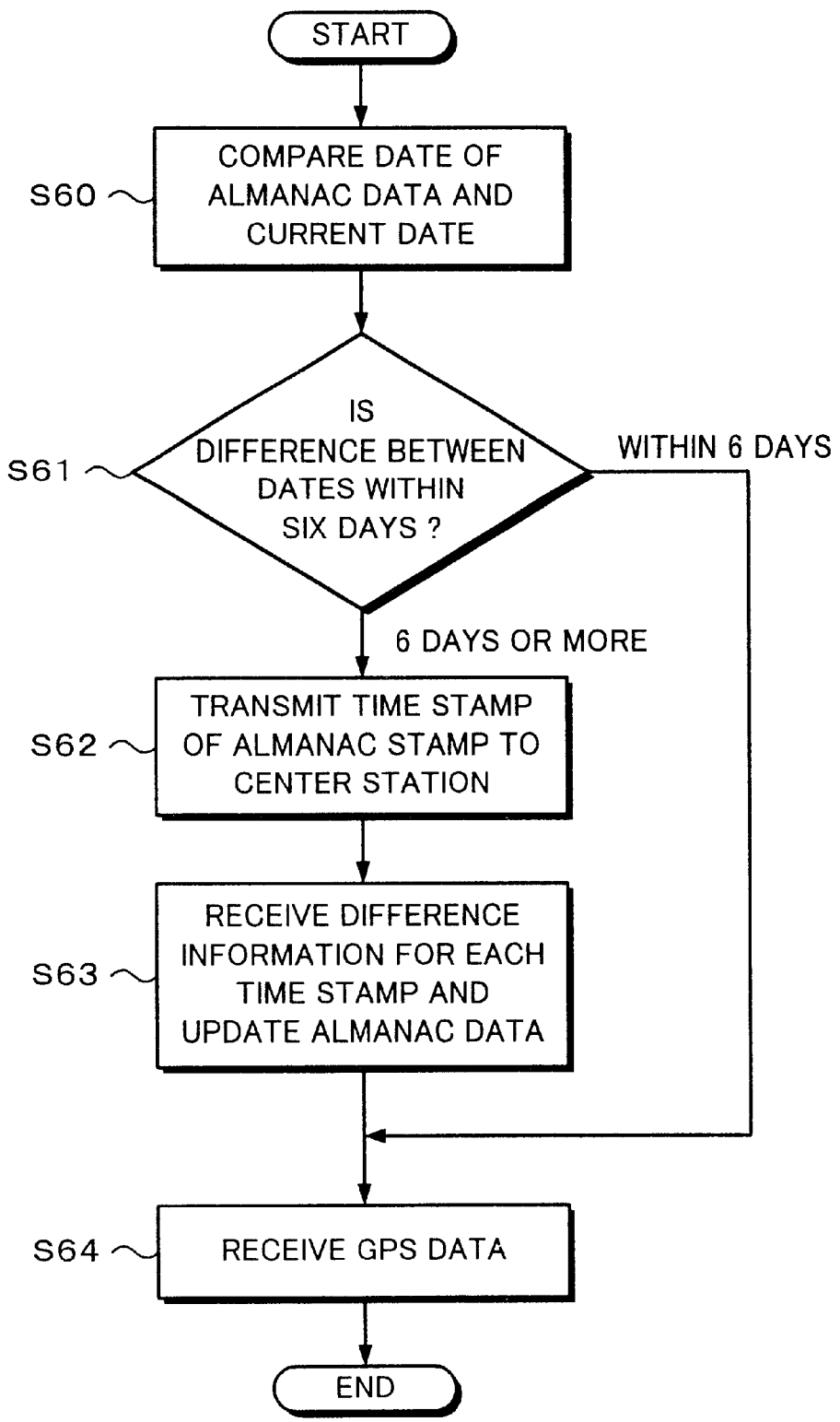
FIG. 8 is a flow chart showing an example of a navigation message downloading process.

FIG. 8 is a flow chart showing an example of a navigation message downloading process. The management center 100 transmits a command to the GPS receiver 102 so as to cause it to obtain the location information thereof. This command is received by the portable telephone terminal 101 and supplied to the GPS receiver 102. Thus, the GPS receiver 102 reads a navigation message stored in the memory 8 and compares the time stamp (date) of the latest almanac data received from a satellite and the current date of the clock 9 (at step S60). At step S61, the GPS receiver 102 obtains the difference between the date of the time stamp of the latest almanac data and the date of the clock 9.

When the difference between these dates is within six days at step S61, the flow advances to step S64. At step S64, the GPS receiver 102 decides a satellite to be used to measure the location thereof corresponding to the almanac data stored in the memory 8 and receives a signal from the decided satellite.

When the difference exceeds six days at step S61, the flow advances to step S62. At step S62, the GPS receiver 102 transmits the time stamp of the almanac data to the management center 100 through the portable telephone terminal 101.

The management center 100 receives the time stamp of the almanac data. The management center 100 selects difference information corresponding to the received time stamp. The difference information is transmitted as a DTMF signal from the management center 100 to the portable telephone terminal 101.

At step S63, the portable telephone terminal 101 receives the DTMF signal. The received DTMF signal is supplied to the GPS receiver 102. The DTMF signal is decoded by the DTMF decoder 11. The decoded signal is supplied as a difference signal to the data processing portion 20. The data processing portion 20 updates relevant almanac data stored in the memory 8 corresponding to the received difference information. Thereafter, the flow advances to step S64. At step S64, the GPS receiver 102 receives the signal from the satellite corresponding to the updated almanac data and measures the location of the GPS receiver 102.

According to the present invention, the location of the GPS receiver 102 is remotely measured corresponding to a user's request. Alternatively, the GPS receiver 102 can automatically measure the location thereof corresponding to data that is set to the GPS receiver 102.

For example, a measurement time interval and a designated area are set to the GPS receiver 102. When a designated area is set, if the GPS receiver 102 enters into or exits from the designated area, an alarm takes place. The time interval and the designated area are set with commands [#06] to [#09] shown in FIG. 3A transmitted from the management center 100 to the GPS receiver 102 through the portable telephone terminal 101.

Thus, the GPS receiver 102 periodically measures the location at the measurement time interval that has been set. As the measured results, when the current location of the GPS receiver 102 exits from the designated area, a command (for example, [*08x] shown in FIG. 3B) is transmitted from the GPS receiver 102 to the management center 100 through the portable telephone terminal 101.

Figure 9:
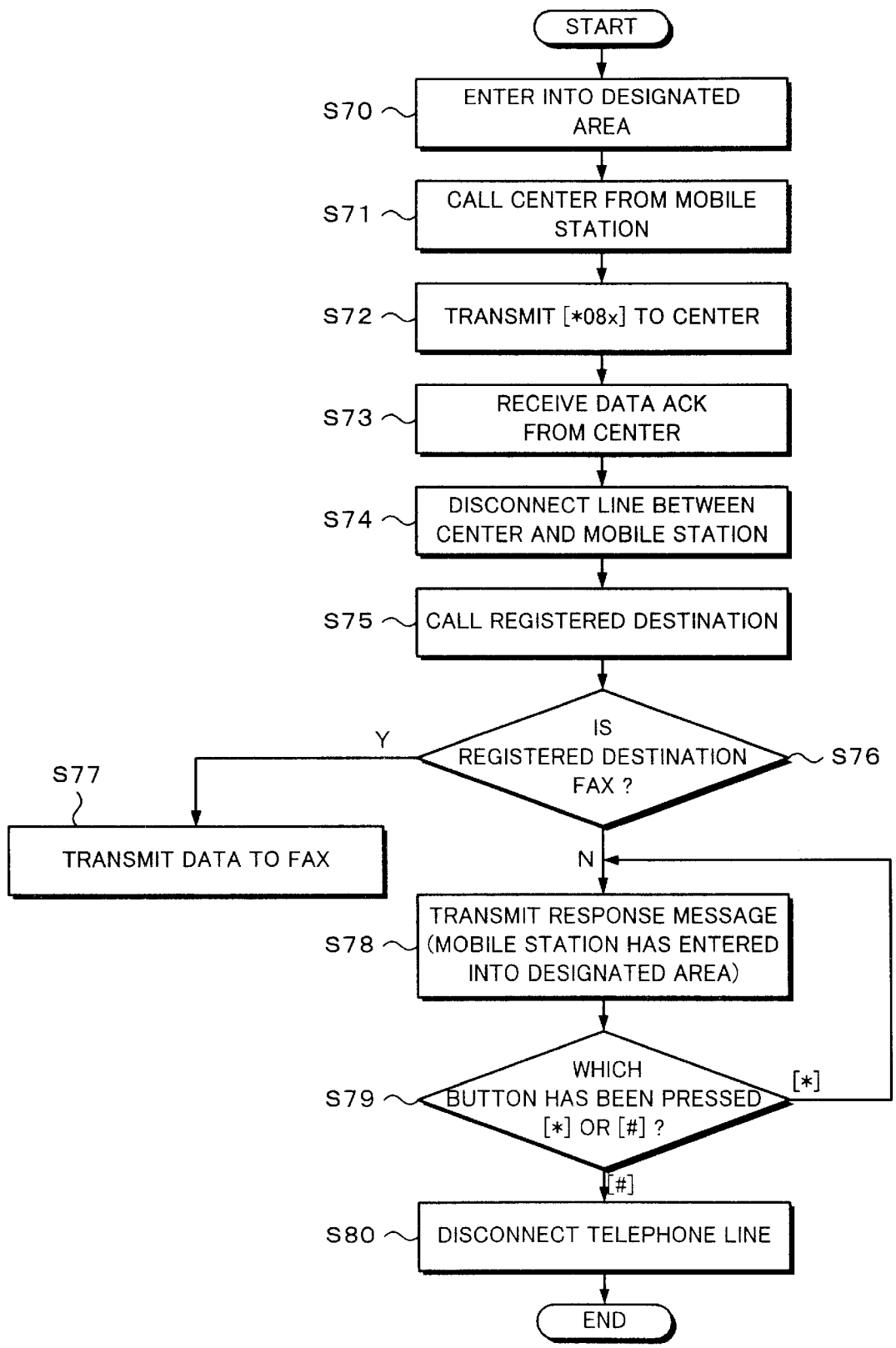
FIG. 9 is a flow chart showing an automatic location measuring process with a designated area.

FIG. 9 is a flow chart showing an automatic location measuring process with a designated area is set. It is assumed that a designated area and a measurement time interval have been set to the GPS receiver 102. The designated area is set by designating an area number assigned on a map. Alternatively, a particular radius of a particular location may be set by designating an area in which a particular mobile station can travel. The designated data is stored in the memory 8.

The management center 100 has registered a destination to which an alarm is transmitted in the case that the GPS receiver 102 enters into or exits from a designated area.

When the data processing portion 20 detects the measurement time corresponding to the time information of the clock 9, the data processing portion 20 controls the power controlling portion 15 so as to turn on the power of the GPS receiver 102 (this process is not shown in FIG. 9). Thus, the GPS receiver 102 receives a signal from a satellite and measures the location of the GPS receiver 102.

When the current location is in the designated area (at step S70), since the GPS receiver 102 has entered into the designated area, the flow advances to step S71. When the GPS receiver 102 has not entered into the designated area, the GPS receiver 102 completes the location measuring process. Thereafter, the data processing portion 20 causes the power controlling portion 15 to turn off the power of the GPS receiver 102 and waits until the measurement time interval elapses.

At step S71, the portable telephone terminal 101 calls the management center 100. Thus, the management center 100 starts communicating with the GPS receiver 102 through the portable telephone terminal 101. In other words, the data processing portion 20 transmits a serial signal to the portable telephone terminal 101 so as activate the portable telephone terminal 101 and connect a line between the portable telephone terminal 101 and the management center 100.

At step S72, the data processing portion 20 transmits command [*08] (see FIG. 3B) as a DTMF signal to the management center 100 through the portable telephone terminal 101. The command [*08] represents that the GPS receiver 102 has entered into a prohibited area as a designated area that has been set.

When the management center 100 normally receives the command, the management center 100 transmits data ACK to the portable telephone terminal 101 (at step S73). The data ACK represents that the management center 100 has normally received the command. The data ACK received by the portable telephone terminal 101 is supplied as a serial signal to the data processing portion 20 of the GPS receiver 102. In addition to the transmission of the data ACK, the management center 100 perform a telephone line disconnecting process for the portable telephone terminal 101 (at step S74).

At step S75, the management center 100 starts communicating with a registered destination. In other words, at step S75, the management center 100 calls a registered destination. In this example, a registered destination is the telephone unit 104 or the facsimile unit 105 connected to the public telephone line 110.

When the registered destination is the facsimile unit 105 (at step S76), the management center 100 transmits a message to the facsimile unit 105 so as to inform it that the GPS receiver 102 is out of the designated area.

When the registered destination is the telephone unit 104 at step S76, the flow advances to step S78. At step S78, the management center 100 transmits a response message to the telephone unit 104 so as to inform it that the GPS receiver 102 is out of the designated area. The response message is an audio message for example "The mobile station OO has exited from the designated area XX.".

At step S79, the management center 100 determines whether the user has pressed the button [*] or the button [#] with the telephone unit 104. When the user has pressed the button [*] at step S79, the flow advances to step S78. At step S78, the management center 100 re-transmits the response message to the telephone unit 104. On the other hand, when the user has pressed the button [#] at step S79, the flow advances to step S80. At step S80, the management center 100 performs a telephone line disconnecting process.

When compensation information of a navigation message transmitted from a reference station (in this example, the management center 100) is used along with a navigation message received by a mobile station (in this example, the GPS receiver 102), the location of the mobile station can be more accurately measured. This location measuring method is referred to as differential GPS. In the differential GPS, the mobile station (namely, the GPS receiver 102) performs a location measuring calculation.

On the other hand, in the location messaging system according to the present invention, the management center 100 transmits a command as a DTMF signal to the GPS receiver 102. Thus, the management center 100 can always obtain a navigation message. Thus, unlike with the differential GPS, according to the present invention, inverted differential GPS of which the management center 100 requests the GPS receiver 102 for a navigation message and the management center 100 re-calculates the measured data corresponding to the received data can be performed.

In addition to a location information request signal, the management center 100 transmits a command as a DTMF signal to the GPS receiver 102 so as to require a satellite number of a satellite used for measuring the location of the GPS receiver 100, a pseudo distance obtained in measuring the location thereof, and time data of a signal received from the satellite. The DTMF signal is supplied to the data processing portion 20 of the GPS receiver 102 through the portable telephone terminal 101. The data processing portion 20 measures the location of the GPS receiver 102 corresponding to the signal and obtains the pseudo distance and so forth. After measuring the location of the GPS receiver 102, the data processing portion 20 transmits data (such as the obtained pseudo distance data) as a DTMF signal requested by the management center 100 to the management center 100 through the portable telephone terminal 101.

As described above, navigation messages are periodically downloaded to the management center 100. The downloaded navigation messages and difference information of each time point are stored in the management center 100. The management center 100 re-calculates the location information corresponding to data received from the GPS receiver 102 and the difference information stored in the management center 100. Thus, location information can be more accurately obtained. The obtained location information is transmitted to for example the telephone unit 104 or the facsimile unit 105 in the building 103 as the user requests.

In the above-described example, a control signal transmitted between the GPS receiver 102 and the management center 100 through the portable telephone terminal 101 is a DTMF signal. However, it should be noted that the control signal is not limited to the DTMF signal. Instead, a digital signal using a digital line can be used.

As described above, according to the present invention, the GPS receiver has an automatic call receiving function and a data transmitting function. Thus, the location measuring process and setting changing process of the GPS receiver can be remotely controlled.

In addition, according to the present invention, since the GPS receiver has the automatic call receiving function, the power of the GPS receiver can be remotely controlled from the management center.

Moreover, according to the present invention, since the management center that periodically downloads navigation messages is disposed and the navigation messages are exchanged between the management center and the GPS receiver, the location of the GPS receiver can be more accurately measured with the latest navigation message.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A GPS receiver for receiving navigation messages from a plurality of satellites and measuring the location of the GPS receiver corresponding to the received navigation messages, comprising:
   a wireless hand held means connected to said GPS receiver for receiving or transmitting data and control commands;
   signal processing means for receiving signals from the satellites, extracting navigation messages from the signals, and measuring the location of the GPS receiver corresponding to the extracted navigation messages and for receiving a control signal from a navigation control base for determining a measuring time in a predetermined time interval;
   a network means for communication with said base;
   an input or output means for transmitting to or receiving data from said base through said network means so as to control said GPS receiver; and
   transmitting means for adding time information corresponding to said navigation messages to compensate the error location of the GPS receiver at which each of the navigation messages was extracted to the relevant navigation message, storing the navigation message and obtaining a difference information of the navigation messages at a measuring time, and transmitting the resultant data to the outside of the GPS receiver through said wireless hand-held terminal;
   whereby said GPS receiver is operable to power up in response to a message from said base requesting that said receiver transmit data and power down in response to a message from said base acknowledging that said base has successfully received data transmitted from said receiver.

2. The GPS receiver as set forth in claim 1, further comprising:
   receiving means for receiving a control signal from the outside of the GPS receiver,
   wherein said signal processing means and said transmitting means are controlled corresponding to the control signal received by said receiving means.

3. The GPS receiver as set forth in claim 1,
   wherein said transmitting means converts the navigation messages and the time information into audio signals and transmits the audio signals.

4. The GPS receiver as set forth in claim 1, further comprising:
   power controlling means for controlling a power supply of the GPS receiver corresponding to the control signal received from the outside of the GPS receiver or an internal control signal of the GPS receiver.

5. The GPS receiver as set forth in claim 2,
   wherein said transmitting means transmits a signal through a hand-held terminal such as a portable telephone terminal, and
   wherein said receiving means receives a signal through said hand-held terminal.

6. The GPS receiver as set forth in claim 1,
   wherein the location of the GPS receiver is intermittently measured.

7. The GPS receiver as set forth in claim 2,
   wherein a signal is polled so that said receiving means automatically receives the signal.

8. The GPS receiver as set forth in claim 1,
   wherein if the measured result of the location of the GPS receiver exceeds a designated area, data that represents the situation is transmitted to the outside of the GPS receiver.

9. A GPS management station for managing a GPS receiver that receives navigation messages from a plurality of satellites and measures the location of the GPS receiver corresponding to the navigation messages and for downloading the navigation messages received from the satellites, comprising:
   a wireless hand held means connected to said GPS receiver for receiving or transmitting data and control commands;
   a network means for transmitting a control signal to the GPS receiver so as to control the GPS receiver;
   means for receiving navigation messages with time information corresponding to said navigation messages to compensate the error location of the GPS receiver at which the navigation messages were extracted from the GPS receiver;
   means for storing said navigation messages and obtaining a difference message of the navigation at a measuring time;
   an input or output means for transmitting to or receiving data through said network means so as to control said GPS receiver; and
   means for receiving a control signal from a navigation control base for determining a measuring time in a predetermined time interval;
   whereby said GPS receiver is operable to power up in response to a message from said base requesting that said receiver transmit data and power down in response to a message from said base acknowledging that said base has successfully received data transmitted from said receiver.

10. The GPS management station as set forth in claim 9, wherein the control signal is converted into an audio signal and then transmitted.

11. The GPS management station as set forth in claim 9, wherein the control signal causes the GPS receiver to measure the location thereof.

12. The GPS management station as set forth in claim 9, wherein the GPS receiver is set with the control signal.

13. The GPS management station as set forth in claim 9, wherein location information corresponding to the received navigation messages is transmitted to an external information unit.

14. The GPS management station as set forth in claim 13, wherein the location information is correlated with map information and then transmitted.

15. The GPS management station as set forth in claim 13, wherein the information unit is a subscriber telephone unit.

16. The GPS management station as set forth in claim 13, wherein the information unit is an image communication unit.

17. A location messaging system, comprising:
a GPS receiver for receiving navigation messages from a plurality of satellites and measuring the location of the GPS receiver corresponding to the received navigation messages, said GPS receiver having
signal processing means for receiving signals from the satellites, extracting navigation messages from the signals, and measuring the location of said GPS receiver corresponding to the extracted navigation messages,
a wireless transmitting means for adding time information corresponding to said navigation messages to compensate the error location of the GPS receiver at which each of the navigation messages was extracted to the relevant navigation message, storing the navigation message and obtaining a difference information of the navigation messages at a measuring time, and transmitting the resultant data to the outside of said GPS receiver through a hand-held terminal; and
receiving means for receiving a control signal from a navigation control base for determining a measuring time in a predetermined time interval; and
a GPS management station having:
means for transmitting a control signal to said GPS receiver so as to control the GPS receiver;
means for storing said navigation messages and obtaining a difference message of the navigation at said measuring time; and
means for receiving navigation messages base through a network means with time information corresponding to said navigation messages at which the navigation messages were extracted from said GPS receiver;
whereby said GPS receiver is operable to power up in response to a message from said base requesting that said receiver transmit data and power down in response to a message from said base acknowledging that said base has successfully received data transmitted from said receiver.

18. The location messaging system as set forth in claim 17,
wherein the control signal is converted into an audio signal and then transmitted.

19. The location messaging system as set forth in claim 17,
wherein said GPS management station transmits a control signal to said GPS receiver, the control signal causing said GPS receiver to measure the location thereof, and
wherein said GPS receiver receives the control signal and measures the location thereof corresponding to the control signal.

20. The location messaging system as set forth in claim 17,
wherein said GPS management station transmits a control signal to said GPS receiver so as to control a power supply of said GPS receiver, and
wherein said GPS receiver receives the control signal and controls the power supply of said GPS receiver corresponding to the received control signal.

21. The location messaging system as set forth in claim 17,
wherein said GPS management station transmits a control signal to said GPS receiver so as to set said GPS receiver.

22. The location messaging system as set forth in claim 17, further comprising:
navigation message storing means for storing the navigation messages received by said receiving means,
wherein when the location of said GPS station is measured, the date of a navigation message stored in said navigation message storing means is compared with the current data, and
wherein if the difference between the date of the navigation message and the current date exceeds a predetermined period, the navigation message stored in said navigation message storing means is updated corresponding to a navigation message downloaded to said GPS management station.

23. The location messaging system as set forth in claim 17,
wherein said GPS management station and said GPS receiver are communicated through a portable telephone terminal.

24. The location messaging system as set forth in claim 17,
wherein said GPS receiver intermittently measures the location thereof.

25. The location messaging system as set forth in claim 17,
wherein said GPS receiver polls a signal so as to automatically receive the signal.

26. A location messaging system, comprising:
a GPS receiver for receiving navigation messages from a plurality of satellites and measuring the location of the GPS receiver corresponding to the received navigation messages, said GPS receiver having
signal processing means for receiving signals from the satellites, extracting navigation messages from the signals, and measuring the location of said GPS receiver corresponding to the extracted navigation messages,
a wireless transmitting means for adding time information corresponding to said navigation messages to compensate the error location of the GPS receiver at which each of the navigation messages was extracted to the relevant navigation message, storing the navigation message and obtaining a difference information of the navigation messages at a measuring time, and transmitting the resultant data to the outside of said GPS receiver through a hand-held terminal; and
receiving means for receiving a control signal from a navigation control base for determining a measuring time in a predetermined time interval;
a GPS management station having:
means for transmitting a control signal to said GPS receiver so as to control the GPS receiver, and
means for receiving navigation messages base through a network means with time information corresponding to said navigation messages at which the navigation messages were extracted from said GPS receiver; and
means for storing said navigation messages and obtaining a difference message of the navigation at said measuring time;
an information unit for communicating with said GPS management station;
whereby said GPS receiver is operable to power up in response to a message from said base requesting that said receiver transmit data and power down in response to a message from said base acknowledging that said base has successfully received data transmitted from said receiver.

27. The location messaging system as set forth in claim 26,
wherein the control signal is converted into an audio signal and then transmitted.

28. The location messaging system as set forth in claim 26, wherein said GPS management station receives a command from said information unit and transmits a control signal to said GPS receiver so as to measure the location thereof, wherein said GPS receiver receives the control signal, measures the location of said GPS receiver corresponding to the control signal, correlates location information as the measured result with map information, and transmits the resultant information to said information unit.

29. The location messaging system as set forth in claim 26, wherein said GPS management station transmits a control signal to said GPS receiver so as to control a power supply thereof, and wherein said GPS receiver receives the control signal and controls the power supply thereof corresponding to the received control signal.

30. The location messaging system as set forth in claim 26, wherein said GPS management station receives a signal from said information unit and transmits a control signal to said GPS receiver so as to set said GPS receiver.

31. The location messaging system as set forth in claim 26, further comprising:

navigation message storing means for storing the navigation messages received by said receiving means, wherein when the location of said GPS station is measured, the date of a navigation message stored in said navigation message storing means is compared with the current data, and wherein if the difference between the date of the navigation message and the current date exceeds a predetermined period, the navigation message stored in said navigation message storing means is updated corresponding to a navigation message downloaded to said GPS management station.

32. The location messaging system as set forth in claim 26, wherein said information unit is a subscriber telephone unit.

33. The location messaging system as set forth in claim 26, wherein said information unit is an image communication unit.

34. The location messaging system as set forth in claim 26, wherein said GPS management station and said GPS receiver are communicated through a portable telephone terminal.

35. The location messaging system as set forth in claim 26, wherein said GPS receiver intermittently measures the location thereof.

36. The location messaging system as set forth in claim 26, wherein said GPS receiver polls a signal so as to automatically receive the signal.

37. A GPS management method for managing a wireless, hand-held GPS receiver that receives navigation messages from a plurality of satellites and measures the location of the GPS receiver corresponding to the navigation messages and for downloading the navigation messages received from the satellites, comprising the steps of:

transmitting a control signal to the GPS receiver so as to control the GPS receiver;

receiving navigation messages with time information corresponding to said navigation messages to compensate the error location of the GPS receiver at which the navigation messages were extracted from the GPS receiver;

receiving a control signal from a navigation control base for determining a measuring time in a predetermined time interval;

communication with said base through a network means;

transmitting to or receiving data from said base through said network means so as to control said GPS receiver; and storing said navigation messages and obtaining a difference message of the navigation at a measuring time;

whereby said GPS receiver is operable to power up in response to a message from said base requesting that said receiver transmit data and power down in response to a message from said base acknowledging that said base has successfully received data transmitted from said receiver.

38. A location messaging method of a system having:

a wireless, hand held GPS receiver for receiving navigation messages from a plurality of satellites and measuring the location of the GPS receiver corresponding to the received navigation messages, and a GPS management station, the location messaging method comprising the steps of:

causing the GPS receiver to receive signals from the satellites, extract navigation messages from the signals, and measure the location of the GPS receiver corresponding to the extracted navigation messages;

causing the GPS receiver to add time information corresponding to said navigation messages to compensate the error location of the GPS receiver at which each of the navigation messages was extracted to the relevant navigation message, store the navigation message and obtaining a difference information of the navigation messages at a measuring time, and transmit the resultant data to the outside of the GPS receiver through a hand-held terminal;

causing the GPS management station to transmit a control signal to the GPS receiver so as to control the GPS receiver;

receiving a control signal from a navigation control base for determining a measuring time in a predetermined time interval;

communication with said base through a network means;

transmitting to or receiving data from said base through said network means so as to control said GPS receiver; and causing the GPS management station to receive navigation messages with time information corresponding to said navigation messages at which the navigation messages were extracted from the GPS receiver;

whereby said GPS receiver is operable to power up in response to a message from said base requesting that said receiver transmit data and power down in response to a message from said base acknowledging that said base has successfully received data transmitted from said receiver.

39. A location messaging method of a system having:
a GPS receiver for receiving navigation messages from a plurality of satellites and measuring the location of the GPS receiver corresponding to the received navigation messages,
a GPS management station, and
an information unit, the location managing method comprising the steps of:
  causing the GPS receiver to receive signals from the satellites, extract navigation messages from the signals, and measure the location of the GPS receiver corresponding to the extracted navigation messages;
  causing the GPS receiver to add time information corresponding to said navigation messages to compensate the error location of the GPS receiver at which each of the navigation messages was extracted to the relevant navigation message, store the navigation message and obtaining a difference information of the navigation messages at a measuring time, and transmit the resultant data to the outside of the GPS receiver through a wireless hand-held terminal;
  causing the GPS receiver to receive a control signal from a navigation control base for determining a measuring time in a predetermined time interval
  causing the GPS management station to transmit a control signal to the GPS receiver so as to control the GPS receiver;
  causing the GPS management station to receive navigation messages with time information corresponding to said navigation messages at which the navigation messages were extracted from the GPS receiver;
  a network means for communication with said base;
  an input or output means for transmitting to or receiving data from said base through said network means so as to control said GPS receiver; and
  causing the GPS management station to transmit the location information of the GPS receiver corresponding to the navigation messages to the information unit;
whereby said GPS receiver is operable to power up in response to a message from said base requesting that said receiver transmit data and power down in response to a message from said base acknowledging that said base has successfully received data transmitted from said receiver.

40. A communication system comprising:
a GPS receiver having the functionality of a wireless communication device;
a base station; and
an information terminal device which can communicate with said GPS receiver through said base station, generating a control command for controlling said GPS receiver, transmitting said command to said GPS receiver through said base station, wherein said GPS receiver operates based on said command transmitted from said information terminal device;
a network means for communication with said base;
an input or output means for transmitting to or receiving data from said base through said network means so as to control said GPS receiver; and
wherein said GPS receiver receives a control signal from a navigation control base for determining a measuring time in a predetermined time interval and a difference information of navigation messages is obtained at said measuring time;
whereby said GPS receiver is operable to power up in response to a message from said base requesting that said receiver transmit data and power down in response to a message from said base acknowledging that said base has successfully received data transmitted from said receiver.

41. A communication method having a GPS receiver having the functionality of a wireless communication device, a base station and an information terminal device which can communicate with said GPS receiver through said base station comprising the steps of:
  communicating between said GPS receiver and an information terminal device through said base station;
  generating a control command for controlling said GPS receiver;
  transmitting said command to said GPS receiver through said base station, wherein said GPS receiver operates based on said command transmitted from said information terminal device;
  a network means for communication with said base;
  an input or output means for transmitting to or receiving data from said base through said network means so as to control said GPS receiver;
  receiving a control signal from a navigation control base for determining a measuring time in a predetermined time interval; and
  obtaining a difference information of navigation messages at said measuring time;
whereby said GPS receiver is operable to power up in response to a message from said base requesting that said receiver transmit data and power down in response to a message from said base acknowledging that said base has successfully received data transmitted from said receiver.

42. An information terminal device which communicates with a GPS receiver having the functionality of a wireless communication device, comprising:
  a generator for generating a control command for controlling said GPS receiver;
  a transmitter for transmitting said command to said GPS receiver through a base station, wherein said GPS receiver operates based on said command wherein said GPS receiver receives a control signal from a navigation control base for determining a measuring time in a predetermined time interval and obtains a difference information of navigation messages at said measuring time; and
  a network means for communication with said base;
  an input or output means for transmitting to or receiving data from said base through said network means so as to control said GPS receiver;
whereby said GPS receiver is operable to power up in response to a message from said base requesting that said receiver transmit data and power down in response to a message from said base acknowledging that said base has successfully received data transmitted from said receiver.

* * * * *